B. AND S. NAGY.
ATTACHMENT FOR FEEDING CUPPED ARTICLES.
APPLICATION FILED APR. 21, 1921.
1,414,786.
Patented May 2, 1922.
2 SHEETS—SHEET 2.
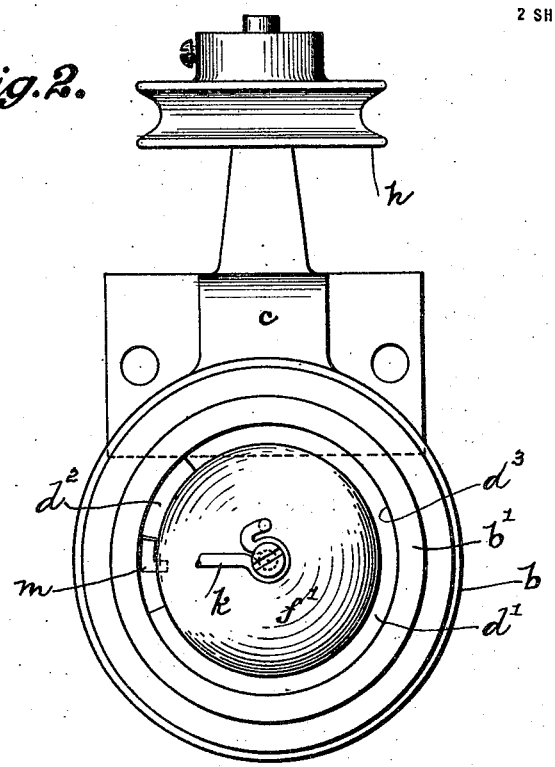
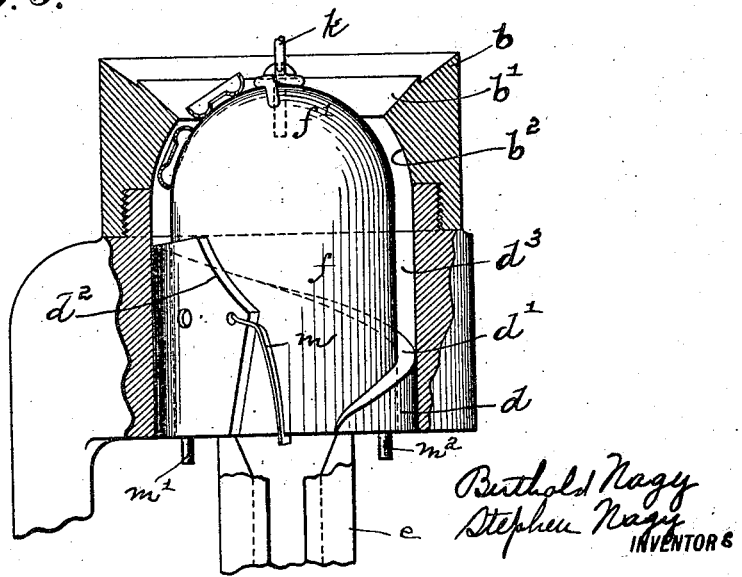
Berthold Nagy
Stephen Nagy
INVENTORS
By Frank T. Wentworth
their ATTORNEY.

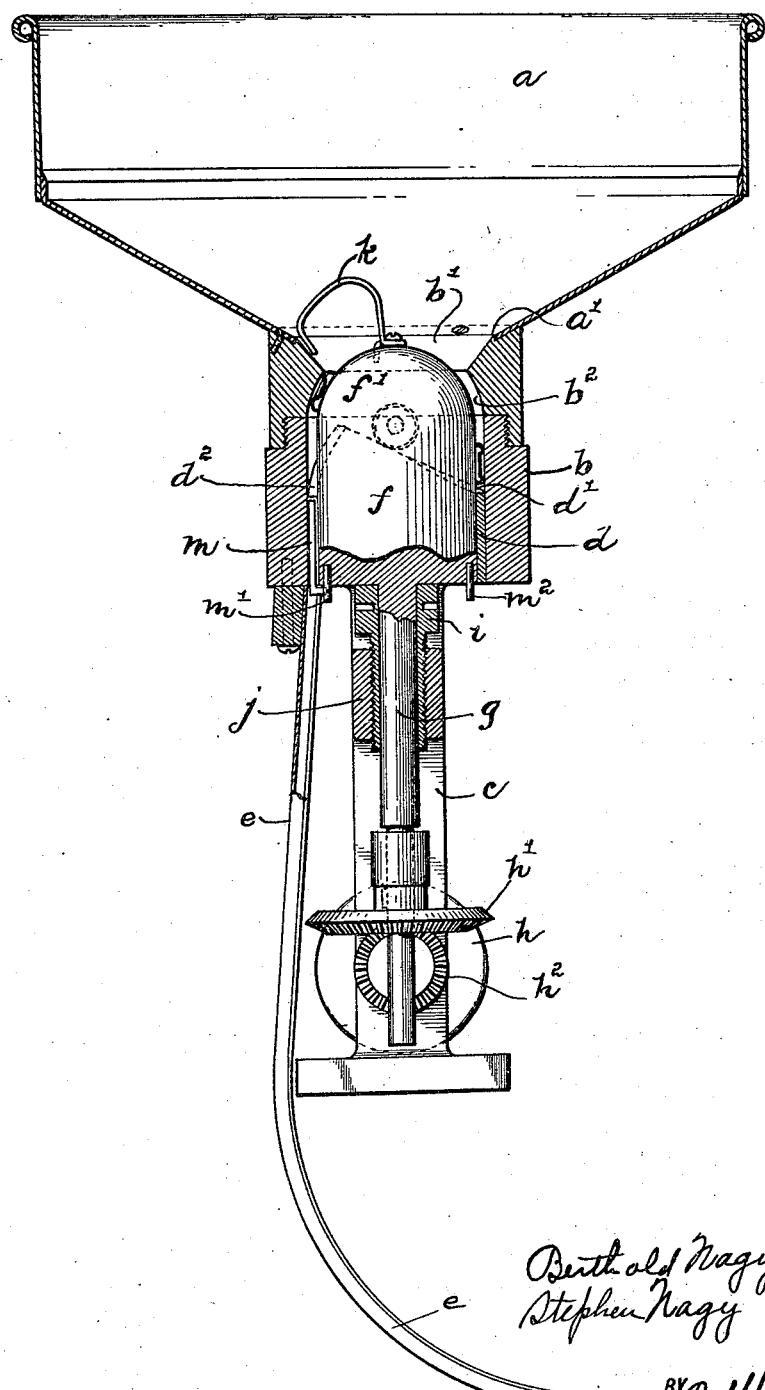

UNITED STATES PATENT OFFICE.

BERTHOLD NAGY AND STEPHEN NAGY, OF BROOKLYN, NEW YORK.

ATTACHMENT FOR FEEDING CUPPED ARTICLES.

1,414,786.      Specification of Letters Patent.      Patented May 2, 1922.

Application filed April 21, 1921. Serial No. 463,291.

*To all whom it may concern:*

Be it known that we, BERTHOLD NAGY and STEPHEN NAGY, both subjects of the King of Hungary, residing at the borough of Brooklyn, in the city of New York, county of Kings, and State of New York, have invented certain new and useful Improvements in Attachments for Feeding Cupped Articles, of which the following is a specification, reference being had therein to the accompanying drawings, which form a part thereof.

Our invention relates to an attachment for feeding cupped articles, and particularly to the feeding of such articles with relation to other mechanisms for doing work thereon wherein it is required to present cupped articles in rapid succession, with each in a particular position.

A machine embodying our invention is so constructed that the cupped articles to be fed may be charged thereinto in bulk, and delivered therefrom one at a time in rapid succession, all articles having the same position when delivered.

Since the articles are charged into a hopper in bulk, it is not only necessary to provide a chute adapted to receive and deliver only one article at a time, but to provide in conjunction with the hopper, a mechanism which will ensure the delivery of each article to the chute only in the proper position, and prevent the obstruction of the outlet to the hopper by improperly positioned articles.

An attachment made in accordance with our invention is designed to feed any cupped articles having a diameter greater than their depth, it being particularly adapted for use in connection with button making machines, crown and other types of bottle caps, and other similar cupped articles.

The mechanism for positioning the articles projects within the outlet of the hopper, and while the chute communicates with this mechanism only at one point, the articles may pass through the outlet at any point thereof about said mechanism, thus ensuring the continuous feed of an adequate number of the articles to the chute notwithstanding the possibility of the jamming of the articles and their frequent improper positioning, to correct which requires a constant agitation of the articles adjacent the outlet of the hopper.

The positioning mechanism adjacent and within the outlet of the hopper, is capable of adjustment with relation to the delivery head so as to accommodate the attachment to articles having substantially the same diameter but different depths, it being necessary to vary the dimensions of the chute, the delivery head and the positioning mechanism, to adapt the attachment for use with articles having any substantial variance in their diameters. In other words, each attachment must be of a size proportioned to the diameter of the articles to be fed.

Adjacent the point of delivery of the articles to the chute, we provide an intermittently actuated agitating device which will ensure proper clearance for the passage of articles into the chute, and thus avoid possibility of the clogging of the feed attachment through the jamming of the articles at the entrance to the chute.

The construction of the delivery head associated with the positioning mechanism is such that each article, as it is properly positioned, will pass by gravity toward the entrance to the chute and be restrained during this movement, against any such possible turning action as will result in a loss of its position, the runway of the chute permitting the articles to descend therein by gravity without change of position.

A machine embodying therein our invention is so constructed as to deliver the cupped articles to some other mechanism as required by that mechanism, but since this mechanism does not form any part of our present invention, it is not shown in the drawings, and will not be herein described.

The invention consists primarily in an attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet and having therein a runway terminating adjacent the inlet of said chute, a positioning device co-operating with said delivery head comprising a rotatable member having a rounded portion presented towards said hopper, and extending adjacent and within the open top of said delivery head, whereby said articles are permitted to pass between said positioning device and the wall of said delivery head only when the cupped side thereof is presented toward said rounded surface, an agitator within said hopper adjacent said delivery head, and means whereby said positioning device and said agitator are actuated; and in such other novel features of construction and combination of parts as are hereinafter set forth and described, and more particularly pointed out in the claims hereto appended.

Referring to the drawings,

Fig. 1 is a side view of an attachment embodying our invention shown partially in section and partly in elevation;

Fig. 2 is a plan view thereof with the hopper removed and upon a slightly enlarged scale; and Fig. 3 is a detail sectional view through the delivery head and the positioning device.

Like letters refer to like parts throughout the several views.

In the embodiment of our invention shown in the drawings, we provide a hopper $a$ adapted to receive in bulk the cupped articles to be fed, said hopper having a bottom outlet opening indicated at $a'$, the converging inclined bottom of the hopper merging into the open top of a delivery head $b$. The upper edge of the top of said head is bevelled as at $b'$ to permit the cupped articles when properly positioned to pass freely from the hopper into the delivery head.

The head $b$ for convenience of production and assembling is made in two pieces as shown, united by means of a screw-threaded joint, one of said pieces being carried by the hopper $a$ and the other being supported by a suitable bracket $c$.

Within the head $b$ is a sleeve $d$ having its upper face pitched in opposite directions as shown, thus forming oppositely declined tracks $d'—d^2$, both of which terminate adjacent and above the inlet end of the chute $e$, the low points thereof being spaced apart sufficiently to permit the unobstructed passage therebetween of the articles to be fed. This sleeve is secured to the head $b$ and remains stationary during the operation of the attachment.

Above the tracks at the top of the sleeve $d$ is a runaway $d^3$, the top of which opens into the hopper through an inwardly curved channel $b^2$, the portion thereof adjacent and above said sleeve being cylindrical.

Rotatably mounted within the head $b$ is a positioning device $f$, the lower portion of which is cylindrical and the top of which is curved or hemispherical, as shown at $f'$, the radius of this spherical portion being substantially coincident with that of the curved wall of the channel $b^2$ of the head $b$ so as to leave an entrance passage between the wall of said head and said positioning device of substantially the same width throughout, although this width, as will more fully appear hereinafter, may be increased or diminished to accommodate the attachment to cupped articles havings skirts of different depths.

The radius of the top $f'$ of the member $f$ and of the wall of the channel $b^2$ adjacent thereto, will be determined by the diameter of the article to be fed, different sized articles requiring attachments having different dimensions in direct proportion to the variance in the diameters of the articles, although the adjustment above referred to will compensate for slight variations in the diameters as well as in the depth of the skirts of such articles.

The member $f$ is carried by a vertically extending shaft $g$ which may be connected to any desired source of power in any desired manner as by means of the pulley $h$ and intermeshing gears $h'—h^2$, the shaft $g$ being splined to the gear $h'$ so as to permit vertical movement of the member $f$.

The upper portion of the shaft $g$ is mounted in a bushing $i$ adjustably mounted in a bracket $j$ as by means of co-operating screw threads on said bushing and said bracket, thus permitting the member $f$ to be raised or lowered to vary the width of the entrance of the channel $b^2$ formed between said member and the upper curved wall of the head $b$. The dimensions of the runway $d^3$ below the channel $b^2$ remain substantially constant, the sole function of this runway being to permit the articles to descend by gravity toward the chute while preventing the turning of the articles after they have once entered the delivery head.

Carried by and revoluble with the member $f$ is an agitator $k$ which is formed as shown, so as to project within the mass of articles within the hopper $a$ above and about the outlet $a'$, this agitator being shown as a single strand of wire which, if desired, may have slight resiliency. The end of said agitator extends substantially parallel with the bevelled portion $b'$ of the head $b$ but terminates at a point spaced away from the top $f'$ of the member $f$ so as to not interfere with articles entering the channel $b^2$ between said member and the curved wall of the upper portion of the head $b$. This construction permits the articles to enter the delivery head at any point about the portion $f'$ of the member $f$, said articles, during the operation of the attachment, frequently falling into the runway $d^3$ towards or upon the tracks $d'—d^2$ at a number of points thereof simultaneously. Said runway usually contains articles in excess of those required to keep the chute $e$ completely filled, thus ensuring a continuous, and adequate supply of the articles at the delivery end of the chute and placing no limitation upon the speed of the mechanism with which the attachment is associated, by reason of the failure to properly deliver the articles in relation thereto.

While the agitator $k$ will prevent such congestion of the articles adjacent the outlet of the hopper as will prevent the rapid feeding thereof towards the runway $d^3$, there is always a possibility that the articles may become jammed adjacent the inlet to the chute $e$. To avoid such jamming, we provide an intermittently operative agitating device which may be aptly called "a jam breaker" consisting of the spring $m$ disposed intermediate the adjacent ends of the tracks $d'$—$d^2$, which is adapted to be engaged by tappets $m'$—$m^2$ projecting from the under face of the member $f$, thus affording additional clearance for the passage of the articles into the chute as the spring is tensioned and imparting a blow to articles in the runway $d^3$ adjacent the inlet to the chute upon the reflex action of the spring after the passage of the tappet from its operative engagement therewith.

The operation of the herein described attachment is substantially as follows:—

The articles to be fed, which must have a cupped form to be suitable for use in the attachment, are delivered in bulk to the hopper $a$ being delivered one at a time in rapid succession to the chute $e$ by means of the delivery head and its co-operating positioning member $f$. When the hopper has been filled, the member $f$ is rotated at fairly high speed so as to cause the agitator $k$ to act upon the mass of articles adjacent the outlet of the hopper to cause such a tumbling action thereof as will bring at least some of the articles with the edge of the skirt presented toward the rounded surface $f'$ of the member $f$. Those articles which are thus presented will slide freely through the opening between this top and the top of the curved portion $b'$ of the delivery head, but such articles as are presented with the skirt outwardly, or away from said member $f$, will be so positioned as to cause the skirt to engage the bevelled portion $b'$ and thus be prevented from entering the runway above the tracks at the top of the sleeve $d$.

Ordinarily with each rotation of the member $f$ a number of articles will be properly presented with relation to the top rounded surface thereof, thus causing a plurality of the articles to simultaneously enter the runway between said member and the delivery head at different points thereof, the form of runway shown permitting all such articles to immediately descend by gravity and with a rolling motion to adjacent the inlet of the chute.

The curvature of the top $f'$, of the member $f$ and of the co-operating wall $b^2$ of the head $b$ will cause properly positioned articles to be out of the path of the end of the agitator $k$ even though the runway be completely filled with the articles.

The device is dependent for its operation upon the condition that if the skirt of the cupped portion is presented toward the surface of the top $f'$, the curvature of this surface will permit the article to be sufficiently close thereto to pass between this surface and the curved wall $b^2$, but if on the contrary the skirt be presented away from this surface, the radius of the arc of movement of the edge of the skirt with relation to the radius of the wall of the curved portion $b^2$ will be so great as to cause the skirt to engage the bevelled portion $b'$. Hence the delivery mechanism and the positioning member act selectively in delivering only those articles which are properly positioned, rejecting all improperly positioned articles.

The spring $m$ acting between the ends of the track forming the bottom of the runway serves merely to prevent the clogging of the runway $d^3$ adjacent the inlet to the chute $e$ and is used as a safeguard to ensure the continuous supply of an adequate number of articles to the chute and prevent any limitation upon the capacity of the mechanism with which the attachment is used.

While the width of the runway $d^3$ will define the maximum depth of the skirt of the article to be fed by the attachment, the upward vertical adjustment of the member $f$ permits the attachment to be set for articles of the same diameter but a narrower skirt. This adjustment may be secured either by means of the adjustable bushing $i$ or if desired, by raising or lowering the upper portion of the head $b$ with relation to the member $f$.

With the delivery chute $e$ formed as shown at the lower end thereof, the articles will be delivered with the edge of the skirt presented upwardly, it being apparent that if it be desired to deliver the articles with the edge of the skirt presented downwardly, it is merely necessary to reverse the direction of projection of the lower end of said chute.

By employing tracks $d'$—$d^2$ oppositely pitched as shown, the articles may approach the inlet to the chute $e$ from opposite directions, thus minimizing likelihood of jamming and ensuring sufficiently rapid delivery of the articles to the chute $e$.

The particular formation of the agitator $k$ will prevent articles falling and remaining flatwise upon the bevelled portion $b'$ so as to obstruct the entrance to the channel $b^2$.

It is apparent that any desired mechanism for imparting continuous rapid rotary movement to the shaft $g$ and the member $f$ carried thereby may be employed, the selection of a driving mechanism for said shaft being a mere matter of mechanical skill, and the adaptability of the attachment to conditions about the machine with which it is used.

It is not our intention to limit the invention to the precise details of construction shown in the accompanying drawings, it being apparent that such may be varied without departing from the spirit and scope of the invention.

Having described the invention, what we claim as new and desire to have protected by Letters Patent, is:—

1. An attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet and having therein a runway inclining towards and terminating adjacent the inlet of said chute, a positioning device cooperating with said delivery head comprising a rotatable member having a cylindrical portion concentric with and within said runway and a rounded portion presented towards said hopper, and extending adjacent and within the open top of said delivery head, whereby said articles are permitted to pass between said positioning device at any point thereof and the wall of said delivery head only when the cupped side thereof is presented toward said rounded surface, an agitator within said hopper adjacent said delivery head, and means whereby said positioning device and said agitator are actuated.

2. An attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet and having therein a runway inclining towards and terminating adjacent the inlet of said chute, a positioning device cooperating with said delivery head comprising a rotatable member having a cylindrical portion concentric with and within said runway and a rounded portion presented towards said hopper, and extending adjacent and within the open top of said delivery head, whereby said articles are permitted to pass between said positioning device at any point thereof and the wall of said delivery head only when the cupped side thereof is presented toward said rounded surface, an agitator within said hopper adjacent said delivery head, means whereby said positioning device and said agitator are actuated, an agitator adjacent the outlet of said runway and the inlet of said chute, and means whereby said agitator is actuated to prevent jamming of articles at the inlet of said chute.

3. An attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet and having therein a runway inclining towards and terminating adjacent the inlet of said chute, a positioning device cooperating with said delivery head comprising a rotatable member having a cylindrical portion concentric with and within said runway and a rounded portion presented towards said hopper, and extending adjacent and within the open top of said delivery head, whereby said articles are permitted to pass between said positioning device at any point thereof and the wall of said delivery head only when the cupped side thereof is presented toward said rounded surface, means whereby said positioning device may be adjusted with relation to said head to vary the width of the entrance passage of said runway, an agitator within said hopper adjacent said delivery head, and means whereby said positioning device and said agitator are actuated.

4. An attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet, a sleeve having oppositely pitched tracks on the upper face thereof within said head and below the outlet to the hopper, the ends of said tracks being spaced apart, whereby a runway inclining towards and terminating adjacent the inlet to said chute is formed, through which articles may descend by gravity from the hopper to the chute, a positioning device co-operating with said delivery head comprising a rotatable member having a cylindrical portion concentric with and within said runway and a rounded portion presented towards said hopper, and extending adjacent and within the open top of said delivery head, whereby said articles are permitted to pass between said positioning device at any point thereof and the wall of said delivery head only when the cupped side thereof is presented toward said rounded surface, said sleeve being fixed with relation to said positioning device, an agitator within said hopper adjacent said delivery head, and means whereby said positioning device and said agitator are actuated.

5. An attachment for feeding cupped articles consisting of a delivery head having a runway therein, a positioning device within said head comprising a rotatable member having a cylindrical portion concentric with and within said runway and a rounded portion projecting upwardly through the opening in said head whereby cupped articles are permitted to pass between said positioning device at any point thereof and the wall of said delivery head only when the cupped side thereof is presented toward said rounded surface, a chute leading from said head, the inlet of which is adjacent the lower end of said runway, a hopper having an inclined bottom converging toward the entrance passage to said runway, said delivery head having a circular bevelled portion merging into the bottom of said hopper, an agitator carried by said positioning device and terminating adjacent said bevelled portion, whereby articles in said hopper will be tumbled about with the actuation of said positioning device and said agitator, and actuating means for said positioning device.

6. An attachment for feeding cupped articles consisting of a delivery head having a runway therein, a positioning device within said head comprising a rotatable member having a rounded portion projecting upwardly through the opening in said head, a chute leading from said head, the inlet of which is adjacent the lower end of said runway, a hopper having an inclined bottom converging toward the entrance passage to said runway, said delivery head having a circular bevelled portion merging into the bottom of said hopper, an agitator carried by said positioning device and terminating adjacent said bevelled portion, whereby articles in said hopper will be tumbled about with the actuation of said positioning device and said agitator, actuating means for said positioning device, a jam breaker in said runway between the ends of said tracks and projecting into the inlet of said chute, and tappets carried by said positioning member and adapted to successively engage said agitating member, whereby jamming of articles at the inlet of said chute is prevented.

7. An attachment for feeding cupped articles consisting of a hopper adapted to receive cupped articles in bulk, having an inclined bottom leading to an outlet opening therein, a chute through which said articles are adapted to descend by gravity, a delivery head opening into said hopper outlet and having therein a runway terminating adjacent the inlet of said chute, a positioning device cooperating with said delivery head comprising a rotatable member having a rounded portion presented towards said hopper, and extending adjacent and within the open top of said delivery head, whereby said articles are permitted to pass between said positioning device and the wall of said delivery head only when the cupped side thereof is presented toward said rounded surface, an agitator within said hopper adjacent said delivery head, means whereby said positioning device and said agitator are actuated, including therein a shaft carrying said positioning device, a bushing in which said shaft is mounted, and a support for said bushing, said bushing and said support being provided with co-operating means whereby said bushing and said shaft may be simultaneously raised or lowered to change the relation of said positioning device and said delivery head to vary the width of the entrance passage to said runway.

8. An attachment for feeding cupped articles consisting of a hopper adapted to receive cupped articles in bulk, having an inclined bottom leading to an outlet opening therein, a chute through which said articles are adapted to descend by gravity, a delivery head formed in two pieces, the lower of which has a cylindrical opening, and the upper of which has an inwardly curved opening merging into said cylindrical opening, a fixed sleeve in said cylindrical opening having the upper surface thereof pitched to form an inclined runway terminating adjacent the inlet of said chute, a positioning device co-operating with said delivery head comprising a rotatable member having a rounded portion presented towards said hopper, and extending adjacent and beyond the open top of the curved piece of said delivery head, whereby said articles are permitted to pass between said positioning device and the wall of said delivery head only when the cupped side thereof is presented toward said rounded surface, an agitator within said hopper adjacent said delivery head, and means whereby said positioning device and said agitator are actuated.

9. An attachment for feeding cupped articles embodying therein a positioning device having a hemispherical top, a delivery head surrounding said positioning device having a curved wall adjacent and spaced away from the upper part of said positioning device, means forming a declining track between said positioning device and said head, a chute into which said runway discharges substantially axially of said head and said positioning device, means adapted to receive cupped articles in bulk above said delivery head and said positioning device, and means tumbling the articles adjacent said positioning device whereby said articles, as they are positioned with the edge of the skirt toward said positioning device, will pass into said runway.

10. An attachment for feeding cupped articles embodying therein a positioning device having a hemispherical top, a delivery head surrounding said positioning device having a curved wall adjacent and spaced away from the upper part of said positioning device, means forming a declining track, between said positioning device and said head, a chute into which said runway discharges substantially axially of said head and said positioning device, a hopper adapted to receive cupped articles in bulk, having a circular inclined bottom converging towards said positioning device, and means tumbling the articles adjacent said positioning device whereby said articles, as they are positioned with the edge of the skirt toward said positioning device, will pass into said runway.

11. An attachment for feeding cupped articles embodying therein a positioning device having a hemispherical top, a delivery head surrounding said positioning device having a circular bevelled upper edge and curved wall adjacent and spaced away from the upper part of said positioning device, a hopper adapted to receive cupped articles in bulk having a circular inclined bottom converging towards and merging into said bevelled edge, means forming a declining track between said positioning device and said head, a chute into which said runway discharges substantially axially of said head and said positioning device, and an agitator comprising a bent wire carried by said positioning device, having its end parallel with said bevelled edge and spaced away from said positioning device, whereby said articles will be positioned with the edge of the skirt towards said positioning device and pass into said runway and said chute.

12. An attachment for feeding cupped articles embodying therein a delivery head having a bevelled upper edge, a curved wall leading downwardly therefrom and a cylindrical portion below said curved wall, a sleeve in said cylindrical portion having oppositely pitched tracks formed on the top edge thereof, the ends of said tracks being spaced apart, a positioning member having a cylindrical portion rotatably mounted in said sleeve, and a hemispherical top having a radius substantially co-incident with that of said curved wall, whereby a runway is formed above said tracks opening upwardly through a curved channel having an open top, a vertically extending chute having its inlet in communication with the lower end of said runway, a hopper having a circular inclined bottom merging into the bevelled upper edge of said delivery head and adapted to receive cupped articles in bulk, an agitator carried by said positioning device projecting into said hopper and having its end parallel with said bevelled edge and spaced away from said device, a spring agitating member arranged between the ends of said tracks and projecting into the inlet of said chute, tappets carried by said device and adapted to engage said spring agitating member, and means rotating said device and the agitator carried thereby.

In witness whereof we have hereunto affixed our signatures in the presence of two subscribing witnesses, this 18th day of April, 1921.

BERTHOLD NAGY.
STEPHEN NAGY.

Witnesses:
F. P. WENTWORTH,
FRIEDA KOEHLER.